March 30, 1954
P. G. PLUMMER
2,673,749
PIPE COUPLING
Filed July 5, 1951
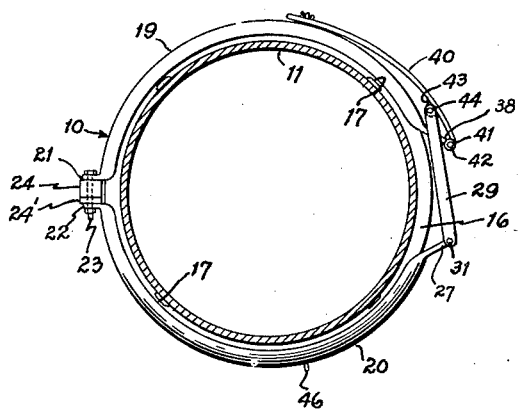
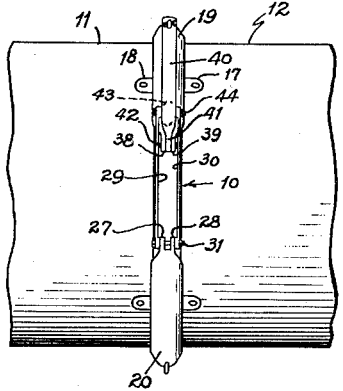
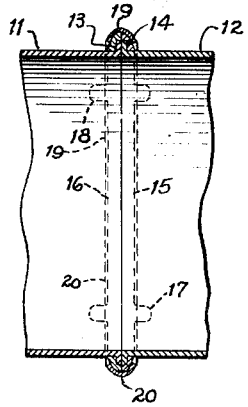
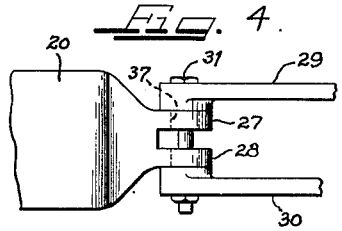
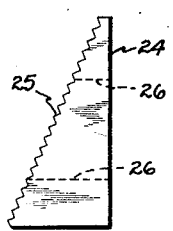
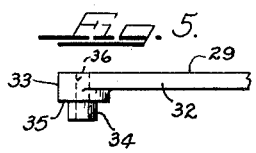
Inventor
PHILO G. PLUMMER
by Charles H. Redman
Atty.

Patented Mar. 30, 1954

2,673,749

UNITED STATES PATENT OFFICE 2,673,749

PIPE COUPLING

Philo G. Plummer, Wasco, Ill.

Application July 5, 1951, Serial No. 235,199

1 Claim. (Cl. 285—129)

This invention relates to couplings and more particularly to improvements in couplings for connecting together pipe or tube sections.

An object of the invention is to provide a coupling by which pipe or tube sections may be coupled or connected together readily, quickly and conveniently.

Another object of the invention is to provide a coupling for holding pipe or tube sections against relative movement either radially or longitudinally.

A still further object of the invention is to provide a coupling which is adjustable for connecting pipe or tube sections of different diameter sizes.

Another and still further object of the invention is to provide a pipe or tube coupling which is simple in design, rugged in construction, economical to manufacture, highly efficient in use, and easily applied and removed.

Other objects and advantages of the invention will become apparent during the course of the following description and from the accompanying drawings, in which:

Figure 1 is a vertical cross-sectional view through one of two pipe or tube sections to which the invention is applied, showing the parts of the coupling in side elevation;

Figure 2 is a fragmental side view in elevation of the coupling as applied to connect together two pipe or tube sections;

Figure 3 is a fragmental vertical longitudinal cross-section view through the connected pipe sections and coupling;

Figure 4 is an enlarged fragmental view in elevation showing details of construction of the hinged joint between the operating links and a ring member of the coupling;

Figure 5 is a fragmental view in side elevation showing details of the end construction of an operating link; and, Figure 6 is an enlarged face view of a spacer wedge construction by which the effective diameter of the coupling may be adjusted.

Referring now to the drawings, my invention of a coupling 10 is shown in Figures 1, 2 and 3 as being applied to adjacent ends of pipe or tube sections 11 and 12 for coupling or connecting them together. The pipe or tube section 11 is provided with an annular coupling flange 13. A similar flange 14 is on the pipe or tube section 12. When the ends of the pipe sections are brought together the outer faces are in abutment, as shown.

A split clamping band is so shaped as to provide sections 15 and 16 which together form a member of circular configuration an inverted U-shape in cross-section to seat on and circumferentially embrace the abutting flanges of the pipe sections. If desired, ears 17 and 18 may be formed on the band sections to seat on the adjacent pipe sections and be connected thereto by any suitable means such as bolts, rivets, spot welding, or the like. The provision of a clamping band is for several reasons. Pipe or tube sections having differently shaped annular flanges may be connected together by a band of complementary internal shape. So long as the external shape of the bands is not changed, the same coupling may be used. Furthermore, the clamping band may be of material embodying characteristics for sealing the pipe joint which would be of particular importance where the pipe or tube sections are required to conduct fluids and liquids.

The pipe coupling 10 includes two semi-circular ring members 19 and 20. Each of the ring members is of channel form so as to receive and embrace the applied clamping band. Both of the ring members are of similar construction and, as shown in Figure 1, the lengths thereof are such as to position adjacent ends in spaced apart relation.

One end of the ring member 19 is turned radially outward to form a projection lug 21. A similar lug 22 is formed at the adjacent end of the ring member 20. The lugs are apertured to loosely receive therethrough a fastening bolt 23.

In Figure 6 is shown a spacer member 24 of generally wedge or triangular shape having a serrated sloping edge 25 defining the hypotenuse thereof. An elongated slot 26 extends through the spacer. Two similar spacers are used each reversed lengthwise relative to the other and with the serrated edges in mutual engagement. In other words, the wide end of one is positioned at the narrow end of the other. In this relation, the similar wedge spacers 24 and 24' are inserted between the lugs 21 and 22 with the bolts 23 passing through the aligned slots 26. When the two spacers are in coextensive alignment they form the widest possible combination. As one is moved in one direction longitudinally relative to the other along the serrated edges, the side edges are moved toward each other thereby effecting a narrower spacer combination. In the opposite direction, the engaged wedges form a wider spacer. The interengagement of the serrations lock the spacers together against relative endwise movement. Relative movement therebetween for adjusting the combined width is limited only by the elongation of the slots 26 through which the fastening bolt passes. Through this adjustment, the ring members may be connected to embrace various sizes of pipe sections. It is to be understood, however, that the invention is not to be limited to the foregoing structure, it being within the scope thereof to provide a coil or other spring between the lug ends of the ring members whereby to adjustably vary the space between the ends by the fastening bolt.

The end of the ring member 20, opposite the lug end 22, is bifurcated to form apertured ears 27 and 28, illustrated in detail in Figure 4. A pair of operating links 29 and 30, of similar construction, are each rotatably secured to a respective ear by a bolt 31 or other suitable fastening means. Each link is of the same construction at opposite ends. As seen in Figure 5, the link 29 has a flat body 32 terminating in an enlarged end 33 with a reduced boss 34 extending therefrom to form a shoulder 35. An opening 36 through the end 33 and boss 34 receives the bolt 31.

The link 29 is applied on the outside of ear 27 with the reduced boss 34 rotatably seated in an opening 37 in the ear. The link 30 is similarly applied to the ear 29 and the assembly rotatably locked in position by the bolt.

The end of the ring member 19, opposite the lug end 21, is similarly bifurcated to form apertured ears 38 and 39. To the ears is pivotally connected a handle 40 having a narrow apertured end 41 seated between the ears and locked thereto by a bolt 42. Intermediate the ends of the handle and on the underside thereof, is an ear or lug 43 suitably apertured to receive therein the reduced bosses on the ends of the links 29 and 30 and locked by a bolt 44.

In the use of the device, the flanged ends of the pipe sections to be locked together are brought into aligned abutment. The split clamping band is then applied in mated relation circumferentially around the abutting flanges. The coupling is first opened by swinging the handle outwardly away from the coupling. This swings the pivot 44 from one side of the pivot 42 to the other and outwardly of a plane through the pivots 31 and 42 thereby moving the ring members away from each other. The coupling is then applied with the ring members embracing the split clamping band and the handle swung inwardly against the ring member 19 to close the coupling. The pivot 44 is then positioned on the side of pivot 42 opposite the pivot 31 and inwardly of a plane drawn therethrough. In its position below dead center, in which the pivot 44 is between the coupling and a plane passing through the rotating axis of pivots 31 and 42, any tension exerted through the connecting links by the ring members tending to swing open away from each other effects a tighter locking of the applied coupling.

If it is desired, the handle may be locked to the ring member 19 by a threaded stud to which a nut 45 is applied. The stud on ring member 19 is similar to stud 46 provided on ring member 20, the ring members being formed alike for interchangeability.

It will thus be seen that the invention provides a simple and reliable coupling which is particularly adapted for use in connecting together lengths of pipe or tube effecting quick and easy connection for use or disconnection after use.

The invention has been described herein more or less precisely as to details, yet it is to be understood that the invention is not limited thereby, as changes may be made in the arrangement and proportion of parts and equivalents may be substituted, without departing from the spirit and scope of the invention.

I claim as my invention:

A coupling for connecting abutting annular flanges of pipes or tubing, comprising a circumferentially split circular band of U-shaped cross-section for embracing said flanges, a diametrically split ring shaped to circumferentially embrace said split band with the pairs of ends of said ring in spaced relation, apertured lugs on one pair of adjacent ends of said split ring, spacing means comprising a pair of complementary wedges facing each other to form a parallel-sided washer, each triangularly shaped with a serrated tapered edge and a narrow, elongated opening, the wedges being interposed between said lugs and arranged in contraposition to present parallel end planes with the serrated edges in interengagement and the elongated openings in alignment, a locking bolt through said lugs and wedges whereby one wedge is adjustable lengthwise relative to the other within the limits defined by said elongated openings for varying the effective thickness of the wedges and the space between said lugs, an operating lever pivotally connected to one of the other pair of adjacent ends of said diametrically split ring, and a link mechanism pivotally connecting the other of said other pair of ends with said operating lever intermediately thereof whereby said operating lever actuates said other pair of ends toward and away from each other.

PHILO G. PLUMMER.

References Cited in the file of this patent
UNITED STATES PATENTS

| Number | Name | Date |
| --- | --- | --- |
| 5,651 | West et al. | June 27, 1848 |
| 196,807 | Jolliffe et al. | Nov. 6, 1877 |
| 233,145 | Demarest | Oct. 12, 1880 |
| 268,457 | Brown | Dec. 5, 1882 |
| 394,462 | Cook | Dec. 11, 1888 |
| 403,501 | Mitchell | May 14, 1889 |
| 2,405,889 | Kennedy | Aug. 13, 1946 |
| 2,519,847 | Neely | Aug. 22, 1950 |